(12) United States Patent
Callahan et al.

(10) Patent No.: US 10,900,668 B2
(45) Date of Patent: Jan. 26, 2021

(54) RECIRCULATING FLUID HEATING SYSTEMS

(71) Applicant: Heatworks Technologies, Inc., Sullivans Island, SC (US)

(72) Inventors: Jeremiah M. Callahan, Sullivan's Island, SC (US); Eric J. Doesburg, Charleston, SC (US); Gregory S. Lyon, Mamaroneck, NY (US); Michael J. Wieckowski, Charleston, SC (US)

(73) Assignee: Heatworks Technologies, Inc., Sullivan's Island, SC (US)

( * ) Notice: Subject to any disclaimer, the term of this patent is extended or adjusted under 35 U.S.C. 154(b) by 0 days.

(21) Appl. No.: 16/000,481

(22) Filed: Jun. 5, 2018

(65) Prior Publication Data

US 2018/0347830 A1 Dec. 6, 2018

Related U.S. Application Data

(60) Provisional application No. 62/515,831, filed on Jun. 6, 2017.

(51) Int. Cl.
*F24H 1/08* (2006.01)
*F24D 17/00* (2006.01)
(Continued)

(52) U.S. Cl.
CPC ..... *F24D 17/0078* (2013.01); *F24D 17/0031* (2013.01); *F24D 19/1012* (2013.01);
(Continued)

(58) Field of Classification Search
CPC ..... F24H 1/10; F24H 1/00; F24H 1/08; F24C 13/00; F24D 3/00; F24D 3/02
See application file for complete search history.

(56) References Cited

U.S. PATENT DOCUMENTS

| 1,553,491 A | 9/1925 | Werner |
| 1,555,338 A | 9/1925 | Vaughan |
| (Continued) | | |

FOREIGN PATENT DOCUMENTS

| CN | 103353141 A | 10/2013 |
| CN | 104864265 A | 8/2015 |
| (Continued) | | |

OTHER PUBLICATIONS

International Search Report and Written Opinion from PCT/US2018/036075, dated Sep. 4, 2018, pp. 1-118.
(Continued)

*Primary Examiner* — Gregory A Wilson
(74) *Attorney, Agent, or Firm* — Lerner, David, Littenberg, Krumholz & Mentlik, LLP (57) ABSTRACT

A liquid heating system includes an instantaneous heater (18) having an inlet (20) connected to a reservoir (62). The outlet (22) of the heater is connected to fixtures (72) which use the heated liquid, and is also connected through a return connection (30) to the reservoir. In an idle mode, a pump 40 draws liquid from the reservoir (62), so that the liquid circulates through the heater and back to the reservoir. A controller (52) actuates the heater to heat the liquid to a first setpoint temperature, so that the liquid in the reservoir stabilizes at the first setpoint temperature. In a supply mode, some or all of the heated liquid flows from the outlet to the fixtures (72). Cold liquid is admitted from a supply (60) to the reservoir, and cold liquid desirably also is supplied to the heater inlet along with liquid from the reservoir, so that the heater inlet receives a combination of these. The controller controls the proportion of cold liquid to liquid from the reservoir in the combination, so as to maintain the heater at a setpoint heating rate while also maintaining the tempera-
(Continued)

ture of liquid discharged from the heater outlet at or near a setpoint temperature.

16 Claims, 4 Drawing Sheets

(51) Int. Cl.
    *F24D 19/10*     (2006.01)
    *F24H 9/12*     (2006.01)
    *F24H 9/20*     (2006.01)
    *F24H 1/12*     (2006.01)

(52) U.S. Cl.
    CPC ..... *F24D 19/1015* (2013.01); *F24D 19/1051* (2013.01); *F24H 1/08* (2013.01); *F24H 1/122* (2013.01); *F24H 1/125* (2013.01); *F24H 9/128* (2013.01); *F24H 9/2028* (2013.01); *F24D 2220/025* (2013.01); *F24D 2220/0207* (2013.01); *F24D 2220/042* (2013.01)

(56) References Cited

U.S. PATENT DOCUMENTS

| | | | |
|---|---|---|---|
| 1,698,561 A | 1/1929 | Ransom | |
| 2,033,260 A | 3/1936 | Sterick | |
| 3,705,574 A | 12/1972 | Duncan | |
| 4,977,885 A * | 12/1990 | Herweyer | F24D 17/00 122/14.31 |
| 7,298,968 B1 | 11/2007 | Boros et al. | |
| 7,773,868 B2 * | 8/2010 | Moore | F24D 19/1051 122/14.3 |
| 8,191,513 B2 * | 6/2012 | Krause | F24D 17/0078 122/20 R |
| 8,971,694 B2 * | 3/2015 | Deivasigamani | G05D 23/1919 392/308 |
| 9,702,585 B2 * | 7/2017 | Hayden | F24H 1/0018 |
| 2010/0313765 A1 * | 12/2010 | Hale | A47J 31/44 99/288 |
| 2013/0247997 A1 | 9/2013 | Ng et al. | |
| 2014/0023352 A1 | 1/2014 | Jurczyszak et al. | |

FOREIGN PATENT DOCUMENTS

| | | |
|---|---|---|
| CN | 204704923 U | 10/2015 |
| WO | 2016100710 A1 | 6/2016 |

OTHER PUBLICATIONS

Chinese Search Report for Application No. 201880049090.X dated Nov. 23, 2020, 2 pages.

* cited by examiner

RECIRCULATING FLUID HEATING SYSTEMS

CROSS-REFERENCE TO RELATED APPLICATIONS

The present application claims benefit of U.S. Provisional Patent Application 62/515,831, filed Jun. 6, 2017, the disclosure of which is hereby incorporated by reference herein.

BACKGROUND OF THE INVENTION

The present invention relates to devices for heating fluids and related methods.

In many applications, it is desirable to heat a liquid to a specified use temperature. For example, plumbing systems used to supply potable water commonly include a supply of water such as a utility water main connection, a well or a storage cistern, and a heater for heating some of the water to make hot water for applications such as bathing, hand washing, laundry and the like.

Two main types of liquid heaters have been used in plumbing systems heretofore. A "tank-type" heater uses a heat source such an oil or gas burner or an electrical resistance element to heat a tank filled with water, so as to accumulate a reserve of hot water at the use temperature. Fixtures connected to the tank draw hot water intermittently from the top of the tank, while cold water from the supply enters the bottom of the tank. Typically, the heat source cannot heat water at a rate high enough to replace all of the hot water drawn from the tank during periods of peak demand. Thus, during a period of peak demand, the reserve of hot water can be depleted and the temperature of the water supplied to the fixtures will decline. Because the tank is a heated pressure vessel, it typically is a large, factory-made unit which incorporates safety features to prevent a steam explosion in the event of a malfunction. This tends to make the tank itself expensive and also to raise the cost of shipping and installing the tank. Moreover, heat loss from the tank to the surrounding air typically causes a tank type heater to consume energy even when no hot water is being drawn from the fixtures.

An "instantaneous" heater is arranged to heat water from the source as the water from the source to the fixture, and does not store a significant amount to heated water. An instantaneous heater includes a heat source such as a burner and heat exchanger, electrical resistance elements arranged to heat the flowing water, or electrodes arranged to direct an electric current through the flowing water. Instantaneous heaters can be compact and can have lower shipping and installation costs. However, an instantaneous heater typically must provide heat at a rate sufficient to heat water at the maximum flow rate during periods of peak demand. This tends to increase the size and cost of the heater. Moreover, the heating rate may be limited by the available power supply as, for example, the available electrical power.

However, still further improvement would be desirable.

BRIEF SUMMARY OF THE INVENTION

One aspect of the present invention provides a liquid heating system. A system according to this aspect of the invention desirably includes a reservoir and a cold liquid supply communicating with the reservoir. The system desirably includes a heater having an inlet connected to the reservoir and an outlet connected to one or more fixtures which will use the heated liquid. The system according to this aspect of the invention desirably also includes a heated liquid return connection connected between the outlet of the heater and the reservoir. The system desirably further includes a pump connected in series with the heater, whereby the pump can draw liquid from the reservoir and impel the liquid in a predetermined downstream direction through the heater and through the return connection to the reservoir. Preferably, the system includes a controller operable to actuate the heater to supply heat to liquid passing from the inlet to the outlet so as to bring the liquid at the outlet to a setpoint temperature. The return connection and pump desirably are constructed and arranged to permit liquid flow from the outlet of the heater to the reservoir but prevent liquid flow from the reservoir to the fixtures through the return connection. The system according to this aspect of the invention may include a cold liquid intake connection connected between the source of cold liquid and the inlet of the heater, the controller being operative to actuate the cold liquid inlet connection to block cold liquid flow through the intake connection or to provide cold liquid flow so that a combination of cold liquid and liquid from the reservoir is supplied to the inlet of the heater. The controller may be operative to control a ratio of (i) cold liquid from the cold liquid intake connection to (ii) liquid from the reservoir supplied to the inlet of the heater and thereby maintain the heater at a heating rate at or near a setpoint heating rate while maintaining liquid discharged from the heater at or near the setpoint temperature. As further discussed below, certain systems according to this aspect of the invention can provide useful heating performance under a variety of flow conditions.

A further aspect of the invention provides a heating unit for use in a liquid heating system. The heating unit according to this aspect of the invention desirably includes a frame and components mounted to the frame. These components desirably include a heater having an inlet and an outlet and may further include an outlet end connection connected to the outlet of the heater, the outlet end connection assembly including a reservoir return connection point and a fixture connection point, as well as an inlet end connection defining a reservoir draw connection point communicating with the inlet of the heater. The components mounted to the frame may include a pump connected in series with the heater, the pump being operable to impel liquid from the inlet end connection to the outlet end connection through the heater, the outlet end connection assembly being arranged to allow liquid flow from the outlet of the heater to the reservoir return connection point but prevent liquid flow from the reservoir return connection point to the outlet of the heater and the fixture connection point. The unit according to this aspect of the invention desirably further includes a controller operable to actuate the heater to supply heat to liquid passing from the inlet to the outlet so as to maintain the liquid passing out of the outlet at a setpoint temperature. A unit according to this aspect of the invention may be used, for example, in construction of a system as discussed above.

DETAILED DESCRIPTION

A modular heating unit 10 (FIG. 1) according to one embodiment of the invention incorporates a frame 12 which is used to mount the other components of the unit. In this embodiment, frame 10 includes a structural element 14 used to support the other components discussed below and a cover 16 arranged so that the cover and structural element cooperatively define an enclosure. The other components of unit 10 may be partially or wholly disposed within the enclosure, and are secured to the frame by conventional elements (not shown). Desirably, unit 10 is preassembled, as in mass production at a factory, so as to reduce the need for field work at the location where the unit is installed.

Figure 1:
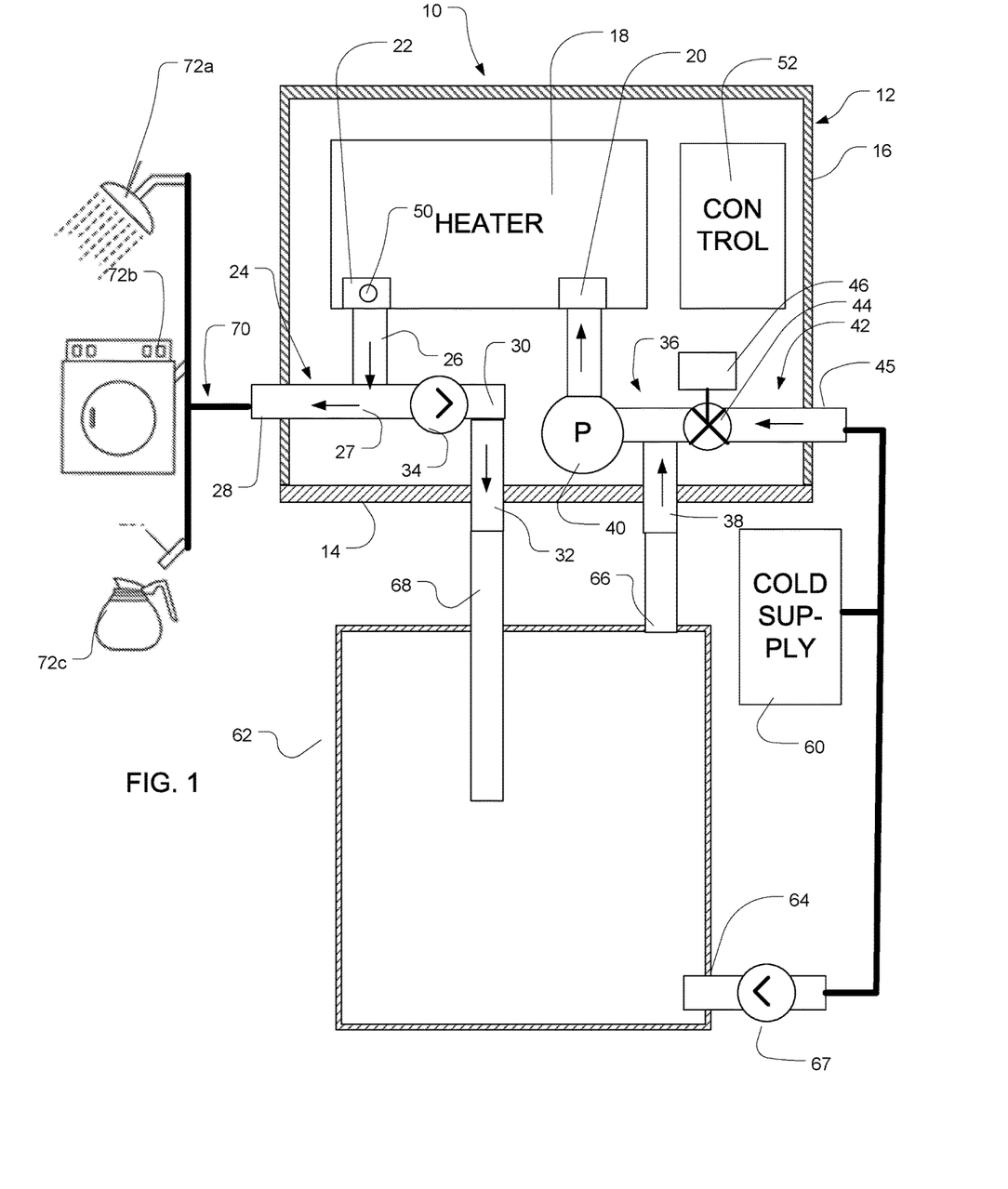
FIG. 1 is a diagrammatic, partially sectional view of a heating unit and system in accordance with one embodiment of the invention.

Unit 10 includes a heater 18 having an inlet 20 and an outlet 22. Heater 18 is constructed and arranged to heat liquid passing from the inlet 20 to the outlet 22. Heater 18 may be a heater of the type commonly referred to in the art as an "instantaneous" heater. One form of instantaneous heater is an ohmic heater which heats the liquid by directing electric current through the liquid itself so that the liquid is heated by conversion of electrical energy to heat within the liquid itself. Certain particularly desirable ohmic heaters are disclosed in U.S. Pat. Nos. 7,817,906 and 9,587,853, and in published International Application Publication WO 2018/085773, the disclosures of which are hereby incorporated by reference herein. Other types of instantaneous heaters can be used. For example, heater 18 may be an electrical resistance heater arranged to direct electrical current through a solid heating element which is electrically insulated from the liquid and the transfer heat from the heating element to the liquid; or a combustion heater which includes a burner and a heat exchanger to transfer heat from combustion gases to the liquid. Heater 18 desirably is arranged to vary the amount of heat supplied to the liquid per unit time, referred to herein as the "heating rate", over a range of non-zero values while the heater is in operation. Such variation may be continuous or stepwise. However if the variation is stepwise, it desirably includes a large number of steps which approximate continuous variation.

An outlet end connection 24 includes a pipe 26 connected to the outlet 22 of the heater. A branch connecting pipe 27 extends from pipe 26 to a fixture connection point 28. Another branch pipe 30 extends from pipe 26 to a reservoir return connection point 32. A check valve 34 is mounted in branch pipe 30. The check valve permits flow from the heater outlet 22 to the reservoir return connection point 32, but blocks flow in the opposite direction.

An inlet end connection 36 extends between a reservoir draw connection point 38 and the inlet 20 of heater 18. A pump 40 is connected in the inlet end connection, and thus is connected in a series flow relationship with heater 18. The pump is constructed and arranged to move liquid in the forward flow direction, by drawing liquid from the reservoir draw connection point 38 and forcing the liquid through the inlet of the heater. In this embodiment, pump 38 may be a relatively low-power pump.

A cold water intake connection pipe 42 extends from a cold liquid supply connection point 45 to the inlet end connection 36. A throttling valve 44 is mounted in the cold water intake connection pipe 42. Valve 44 is operated by an actuator such as a solenoid or motor-driven actuator. The actuator can bring valve 44 to a fully closed position in which the valve entirely blocks flow within the cold water intake 42; to a full open position in which the valve offers low resistance to flow in the cold water intake, or to intermediate positions so as to vary the flow resistance in the cold water intake.

The modular heating unit 10 further includes a temperature sensor 50 in thermal communication with liquid passing through the outlet 22 of the heater to fixture connection point 27. Desirably, the temperature sensor is disposed adjacent the outlet as, for example, within the heater at the outlet or slightly upstream of the outlet, between the operative elements of the heater and the outlet, or within pipe 26 of the outlet end connection 24. Positioning the temperature sensor close to the operative elements of the heater minimizes the time required for the temperature sensor to respond to changes in operation of the heater.

Unit 10 further includes a controller 52. Controller 52 is linked to the temperature sensor 50 for receipt of outlet liquid temperature information; to heater 18 so that the controller can detect the heating rate applied by the heater and adjust the heating rate, to pump 40 so that the controller can activate and deactivate the pump; and to valve actuator 46 so that the controller can open and close valve 44 and adjust valve 44 to intermediate positions. Controller 52 is arranged to perform the control operations discussed below. The controller may include, analog, digital or mixed electronic elements, and may also include optical, mechanical and electromechanical elements. Most typically, the controller includes one or more programmable digital microelectronic circuits which are programmed to perform the control operations discussed below. The program may be "hardwired" in the circuits, or may be stored as one or more sets of instructions in a memory (not shown) incorporated in the controller. The controller may have a stored set point temperature and setpoint heating rate permanently stored during manufacture, or may have a user-adjustable control (not shown) for adjusting the setpoint temperature, setpoint heating rate, or both. The controller typically includes conventional interfacing and drive circuits (not shown) for translating between logic-level signals and signals at the levels needed to actuate other components, and may also include conventional analog-to-digital and digital-to-analog converters. Unit 10 further includes appropriate power supply connections (not shown) for supplying electrical power to the other elements of the system. Where the heater is a combustion heater, an appropriate fuel supply connection desirably is also included in unit 10. The power supply and fuel supply connections to the heater may be connected to the drive circuits of the controller. Although the controller is depicted in FIG. 1 as a unitary structure, it may incorporate multiple elements performing the various functions discussed below. Also, although the controller is depicted as housed within the enclosure defined by frame 10, some or all of the elements constituting the controller may be disposed outside of the controller. The connections between elements of the controller, and the connections between the controller and other elements of unit 10, may be made through any medium of communication.

Unit 10 may also include backup elements (not shown) to assure safety in the event of component failure. For example, the unit may include elements such as fusible links or other thermally-responsive elements for cutting off power to the heater 18 in the event that the temperature within the heater rises above a safety threshold, and a safety valve for relieving excess pressure within the heater.

A heated fluid supply system in accordance with a further embodiment of the invention includes unit 10. The system depicted in FIG. 1 is arranged to supply heated potable water as for example in a building or vehicle. The system includes a source 60 of cold water, and the source is arranged to supply the cold water under a pressure as typically used in plumbing systems as, for example, about 40 to about 125 pounds per square inch, or about 275 to about 860 KPa. For example, the cold fluid source may be a connection to a utility system water main, or a well pump and pressure tank as commonly used in rural areas. The system also includes a reservoir 62 in the form of a pressure vessel such as a tank capable of withstanding the pressure exerted by the cold fluid source. Tank 62 has a supply port 64 which is connected to source 60 through a check valve 67 so that the cold water from the source can enter the tank at or near the bottom of the tank but water cannot flow out of the tank. Source 60 is also connected to the cold water intake connection pipe 42 of unit 10 at connection point 45.

Tank 62 has a hot water outlet port 66 which is connected to the inlet end connection 36 at reservoir draw connection point 38 of unit 10. A return flow tube 68 is connected to the outlet end connection 24 of unit 10 at connection point 32. The return flow tube extends through the wall of the tank 62, and terminates at a level below the top of the tank and below port 66, but above the bottom of the tank.

Most preferably, the reservoir or tank 62 does not include an internal heating source. Stated another way, tank 62 desirably is an "unfired" pressure vessel.

The outlet end connection 24 is connected at connection point 28 to the hot water distribution piping in the building or vehicle, and thus connected to the various fixtures 72 in the building which consume hot water. As diagrammatically shown, the fixtures may include devices such as a shower head 72a, a washing machine 72b and a beverage brewing apparatus 72c. Some or all of these fixtures also may be connected to the cold water source 60 by other piping (not shown).

In operation, in a method of supplying heated fluid according to a further aspect of the invention, tank 62 and the pipes and connections mentioned above are maintained under pressure by source 60.

Figure 2:
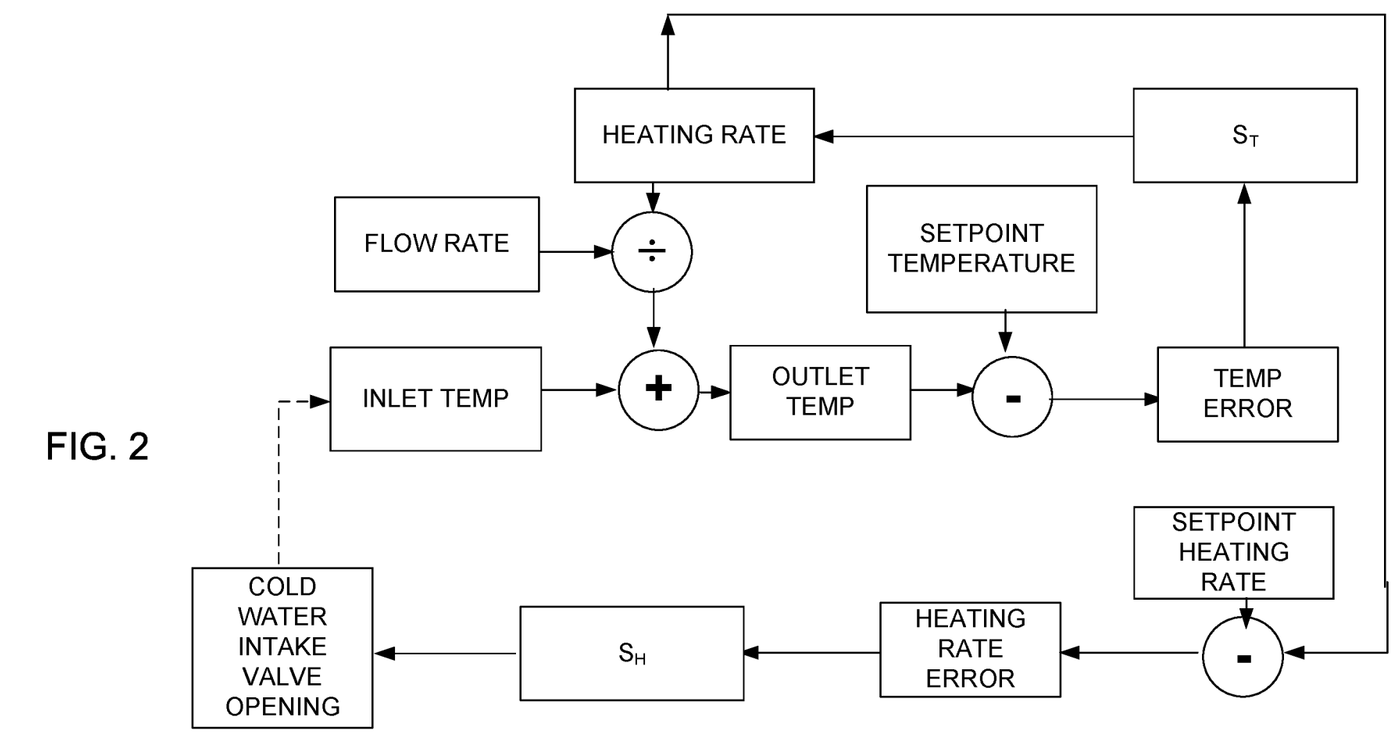
FIG. 2 is a diagram depicting a control regime usable in the unit and system of FIG. 1.

Controller 52 monitors the temperature of water passing out of the heater as measured by sensor 50, and adjusts the heating rate so as to maintain this temperature at the setpoint, and also adjusts the cold liquid intake valve 44 so as to maintain the heating rate at the setpoint heating rate. This control scheme is depicted in FIG. 2. The water flowing into the heater is at an inlet temperature. The heater 18 will raise the temperature of the water by an amount equal to the heating rate divided by the flow rate through the heater, to yield the outlet temperature detected by sensor 50. The difference between the setpoint temperature and the outlet temperature constitutes a temperature error signal, which is passed through a temperature transfer function $S_T$ to provide a processed error signal, and the heating rate is adjusted in accordance with the processed error signal so as to increase the heating rate as the outlet temperature decreases, and vice versa. The transfer function may include one or more of proportional, integral and derivative components as commonly referred to in the control systems art.

The controller also monitors the heating rate applied by heater 18 and subtracts the heating rate from the setpoint heating rate to yield a heating rate error which is processed by a heating rate transfer function $S_H$ to yield a processed error signal. Here again, the transfer function may include one or more of proportional, integral and derivative components. If the heating rate is below the setpoint heating rate, the controller actuates valve actuator 46 so that the cold water intake valve 44 opens progressively, and the flow resistance through valve 44 decreases.

In an idle condition, while no water is being drawn from the system by fixtures 72 (FIG. 1), there will be little or no pressure differential across cold liquid intake valve 44, and thus essentially no flow through the cold liquid intake connection 42 regardless of whether the valve is open or closed. In this condition, pump 40 circulates water from the tank through hot water outlet 66 through heater 18 and back to the tank through outlet end connection 24 and tube 68, so that the inlet temperature of the water passing into the heater will be equal to the temperature of the water near the top of the tank. At startup, with tank 62 full of cold water, this will be far below the setpoint temperature, and the controller will bring heater 18 to a high heating rate. With continued operation, heated water will accumulate near the top of the tank, and the inlet temperature will gradually rise within a preset tolerance from the set point, whereupon the heating rate will decrease to zero. If the heating rate remains at zero for a predetermined interval, the controller will deactivate the pump and the heater for a deactivation interval which may be, for example, several minutes to a half hour or so, and then may reactivate pump 40 at the end of the deactivation interval and resume monitoring the outlet temperature at sensor 50 while leaving heater 18 deactivated. If this temperature remains below the set point temperature by more than a predetermined tolerance after the water has circulated for a period as, for example, a few minutes, the controller activates heater 18 and maintains pump 40 in operation. If the temperature of the circulating water is at the setpoint temperature or within the tolerance while the heater 18 is inactive, the controller leaves the heater deactivated, deactivates the pump, waits for another deactivation interval, and repeats the foregoing steps. Thus, so long as the water near the top of the tank 62 is at or near the setpoint temperature and no water is drawn from the system, the controller will maintain the heater inactive and activate the pump only for brief intervals. Typically, the hot water near the top of the tank cools quickly by conductive and convective heat transfer to cooler water near the bottom of the tank, so that the pump and heater will continue to operate most or all of the time until tank 62 is substantially full of hot water at temperatures near the set point temperature. Once the tank is substantially full of hot water, the heater will operate only intermittently to compensate for heat loss from the tank.

When one or more of the fixtures is opened to draw hot water from the system, the system operates in a supply mode. In this mode of operation, cold water from source 60 passes into the bottom of the tank through cold liquid inlet port 64 and also passes into the inlet end connection 36 through valve 44, so that pump 40 delivers a mixture of hot water drawn from the tank and cold water to the inlet of the heater. This will tend to cause a decrease in the outlet temperature measured by sensor 50, so that the control system will respond by raising the heating rate. If the heating rate exceeds the set point heating rate, the controller will operate actuator 46 to reduce the opening of valve 44, thus increasing the flow resistance between the cold liquid intake connection 42 and the inlet end connection 36, thus reducing the cold water flow through valve 44 and increasing the cold water flow through port 64 at the bottom of the tank. This increases the proportion of hot water drawn from the top of the tank in the water supplied by pump 40 and increases the inlet temperature. The system thus tends to come to an equilibrium condition with the heater operating at the set point heating rate and with the outlet temperature equal to the set point temperature. Stated another way, the flow rate through the heater varies with the demand from fixtures 72. The controller adjusts the ratio of hot water drawn from the reservoir to cold water from the cold water inlet connection which is supplied to the inlet of the heater, so as to adjust the inlet temperature of water entering the inlet of the heater such that at the prevailing flow rate, the heater will operate at the setpoint heating rate to yield an outlet temperature equal to the setpoint temperature.

Desirably, the setpoint heating rate is at or slightly below the maximum heating rate which the heater can provide. Where the fixtures are drawing only a moderate flow of hot water, valve 44 will be fully open, so that all of the hot water leaving the system is replaced by water which enters through the cold water inlet and is heated to the set point temperature. In this condition, the system will operate with no depletion of the hot water stored in tank 62 for an indefinite, theoretically infinite time. In this operating condition, the heater will continue to operate at a rate below the setpoint heating rate. Where the fixtures draw hot water from the system at a higher rate, valve 44 will be partially closed so that a significant amount of hot water is drawn from the tank and replaced by cold water entering the tank through inlet port 64 at the bottom of the tank. However, so long as the heater remains below the setpoint heating rate, valve 44 remains short of fully closed. In this condition, heater 18 acts to extend the time during which the system will continue to supply hot water at the set point temperature. Stated another way, in this condition, heater 18 operates to delay depletion of the hot water in tank 62. In the supply mode of operation, water passes from the reservoir 62 to the fixtures 72 only by way of heater 18, and only flows through the heater in the downstream direction from inlet 20 to outlet 22.

Numerous features of the heater discussed above with reference to FIG. 1 can be varied. For example, the outlet end connection 24 can be connected to the reservoir or tank 62 so that hot liquid is returned to the reservoir near or at the bottom of the reservoir so as to provide more mixing of the returned hot liquid with the colder liquid in the tank. This tends to provide a uniform temperature distribution within tank 62. In one such arrangement, the return fluid connection point of outlet end connection 24 can be connected to the cold water inlet port 64 of the tank as, for example, between check valve 67 and the cold water inlet port.

Control schemes other than the thermostatic feedback control system discussed above can be used. A system according to a further embodiment of the invention (FIG. 3) is generally similar to the system discussed above in connection with FIGS. 1 and 2, but has a flow sensor 104 and temperature sensor 102 associated with the cold liquid inlet pipe 142. A flow sensor 106 and temperature sensor 108 are provided in a section 101 of the inlet end connection 136 which is connected to the reservoir 162 and which will carry only water from the reservoir during service. The outlet end connection is provided with a pressure sensor 103 and flow sensor 119. All of these sensors are linked to controller 152. Here again, a throttling valve 144 is provided between the cold liquid inlet pipe 142 and the inlet end connection 136. Valve 144 is controlled by an actuator linked to the controller 152. Another throttling valve and actuator, also linked to controller 152, is provided in the outlet end connection 124, between the outlet 122 of the heater and the return flow connection to reservoir 162. A check valve is provided at the connection between the outlet end connection 124 and the hot water plumbing 170 of the building, to prevent backflow of water from the plumbing and fixtures 172.

Figure 3:
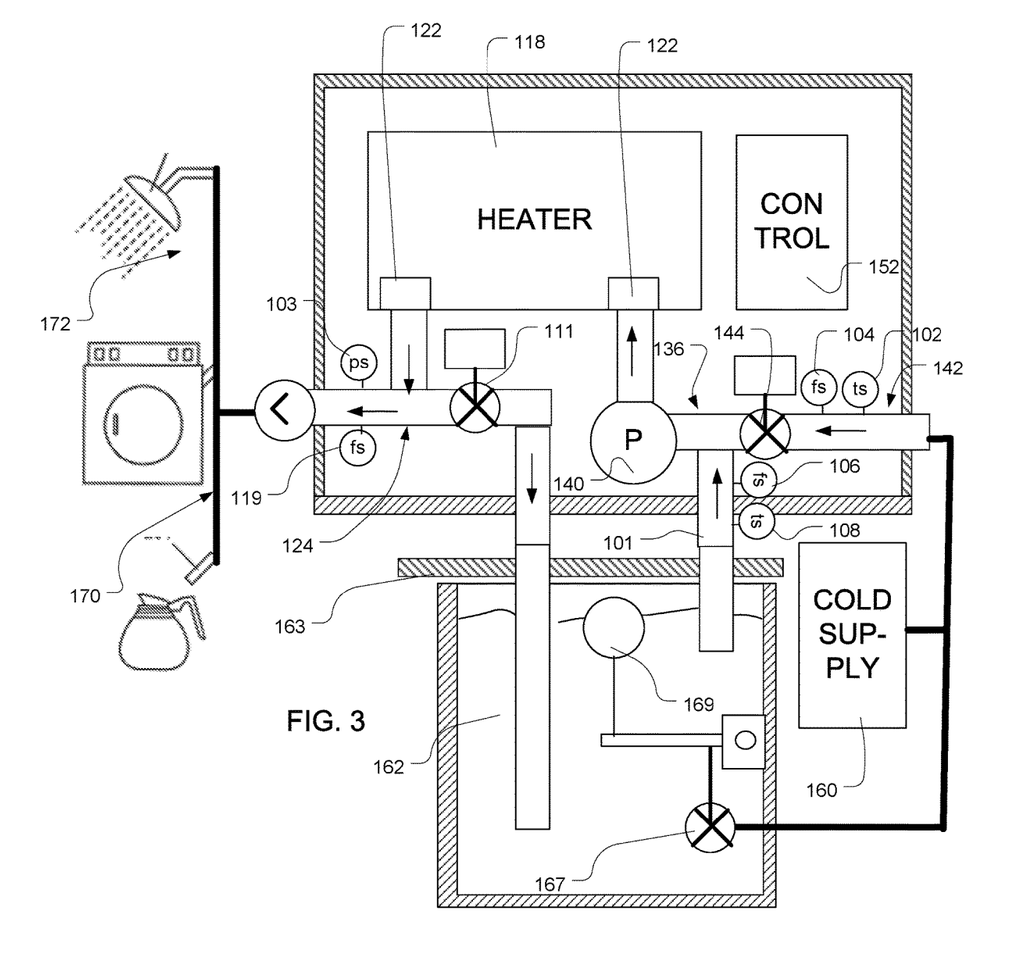
FIG. 3 is a view similar to FIG. 1 but depicting a unit and system in accordance with another embodiment of the invention.

In this embodiment, reservoir 162 is an unpressurized, unfired vessel; although the reservoir is provided with a cover 163 to prevent contamination of the water stored therein, the cover fits loosely so that reservoir remains in communication with the atmosphere. The cold water supply 160 communicates with the reservoir 162 through a float valve 167 actuated by a float 169 positioned within reservoir 162. Valve 167 opens when the water level in the reservoir drops, and closes when the water level rises, so that the valve admits water to the reservoir adjacent the bottom of the reservoir as needed to maintain the water within the reservoir at a substantially constant level.

In operation, the controller 152 actuates pump 140 to impel water through heater 118. The controller adjusts valve 111 and adjusts the operating speed of pump 140 responsive to the pressure detected by sensor 103, so as to maintain a constant pressure in the outlet end connection. During idle operation, with no demand from fixtures 172, flow sensor 119 will indicate zero flow through the outlet end connection to the building plumbing 170. The controller will keep throttling valve 111 open and will keep throttling valve 144 closed, while actuating pump 140 at a relatively low power to circulate liquid through the heater. In this condition, the pump simply recirculates water through the heater and reservoir. Controller 152 sets the heating rate of heater 140 responsive to the flow rate detected by sensor 106 and the water temperature detected by sensor 108, so that the heater will raise the temperature of the circulated water to the setpoint temperature.

When one or more of the fixtures 172 is opened to draw hot water, the flow to the fixtures is detected by sensor 119. In response, the controller enters an active supply mode. In this mode, the controller sets the heating rate of heater 118 to the set point heating rate, raises the pumping power delivered by pump 140 to a higher level, and partially or completely closes throttling valve 111 to maintain the pressure at sensor 103 at a desired level. The setting of throttling valve 111 needed to maintain the pressure will vary with the demand from fixtures 172; as the demand increases, valve 111 will close progressively so that less heated water from heater 118 is returned to the reservoir 162. The total flow rate through the heater may vary as valve 111 closes or opens responsive to the demand from the fixtures. While the fixtures 172 are drawing water at a moderate rate, controller 110 monitors the total flow rate by summing the cold water flow rate from sensor 104 and warm water flow sensor 106, and adjusts the throttling valve 144 so as to deliver a mixture of warm and cold water at a temperature and flow rate such that at prevailing flow rate and at the set point heating rate, the water passing out of the heater will be at the set point temperature. Here again, supplying a mixture of warm and cold water to the heater, and using the heater to bring the mixture up to the set point temperature, allows the system to supply water at the set point temperature for a prolonged period.

Under some operating conditions as, for example, where the water coming from reservoir 162 is at a temperature far below the setpoint temperature, controller 144 will bring valve 144 to a fully closed condition before reaching a mixture which can be brought to the setpoint temperature at the setpoint heating rate. If the setpoint heating rate is below the maximum heating rate of the heater, the controller may increase the applied heating rate above the setpoint heating rate. Under other operating conditions, where fixtures 172 are drawing water at a low rate and where the water drawn from reservoir 172 is at or near the setpoint temperature, operation of the heater at the setpoint heating rate even with valve 144 fully open would heat the water passing through heater 118 to a temperature above the setpoint temperature. In this condition, controller 110 reduces the applied heating rate below the setpoint rate.

The sensors and control systems used in the embodiments discussed above can be varied. For example, a flow-sensitive control scheme as discussed with reference to FIG. 3 may be used in an embodiment similar to that of FIG. 1, with a pressurized reservoir. Conversely, a temperature-sensitive feedback control system as discussed above with reference to FIG. 1 may be used with a pumped system as discussed with reference to FIG. 3.

While the system of FIG. 3 is in an idle condition, the controller may deactivate pump 140 and heater 118 for a deactivation interval and then restart the pump. Here again, if the temperature of the water remains drawn from the reservoir is at or near the setpoint temperature after a restarting the pump, the controller may deactivate the pump for a further deactivation interval. If not, the controller will keep the pump in operation and reactivate heater 118.

In the systems discussed above, the flows are controlled in part by adjustable valves. These can be replaced by other elements capable of providing variable flow as, for example, variable-speed pumps associated with the cold water intake, the reservoir draw connection, and the return connection to the reservoir. Also, in the embodiments discussed above, the flow through the cold water inlet connection can be controlled indirectly by throttling or pumping the connection to the cold water inlet of the reservoir. For example, in the embodiment discussed above with reference to FIG. 1, throttling valve 44 can be provided in the connection to the cold water inlet 64 of the reservoir, rather than in the cold water inlet connection 44. In this arrangement, closing the throttling valve will increase the flow of cold water through the inlet connection. In a further arrangement, the throttling valve 44 can be relocated to the reservoir draw connection 38, so as to control the flow of hot water from reservoir 62. Any of these arrangements will control the proportions of water from the reservoir and water from the cold water inlet connection in the mixture reaching the heater inlet 20. Also, the pump can be connected downstream from the outlet of the heater or incorporated within the heater.

In the discussion above, the setpoint temperature has been treated as a constant value. However, the controller may vary the setpoint temperature. For example, a first, relatively low setpoint temperature may be applied while no water is flowing to the fixtures, whereas a second, higher setpoint temperature is applied while water is flowing to the fixtures. In this arrangement, the temperature of the water in the reservoir will stabilize at the first setpoint temperature, whereas water will be supplied to the fixtures at the second, higher setpoint temperature. This arrangement reduces heat loss from the reservoir, but also reduces the maximum flow rate which can be delivered to the fixtures at the higher setpoint temperature. In a variant of this arrangement, the first, lower setpoint may be applied only when a low demand is expected as, for example, during the night in a typical private home.

A system according to a further embodiment of the invention (FIG. 4) is generally similar to the system of FIGS. 1 and 2 discussed above. However, the outlet end connection 224 includes a manifold which is connected to the outlet 222 of the heater, and to three outlet connection pipes 227a, 227b and 227c. Each outlet connection pipe 227 is provided with a respective shutoff valve 201a, 201b, 201c having an actuator such as a solenoid or motor mechanism capable of closing and opening the shutoff valve. Manifold 226 is connected to a branch pipe 230 leading to the reservoir return connection point and the return conduit 268 extending into reservoir 268.

Figure 4:
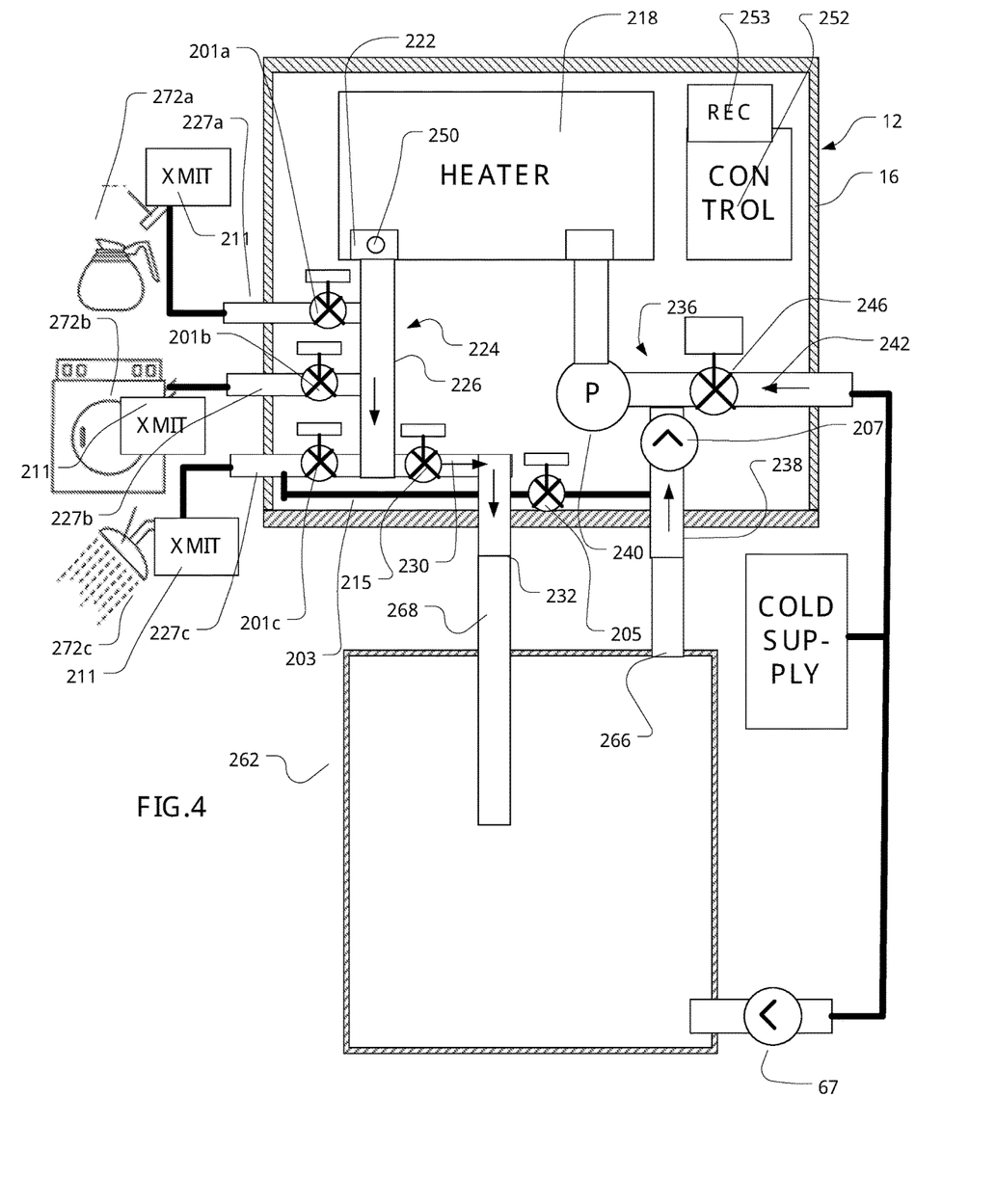
FIG. 4 is another view similar to FIGS. 1 and 3 but depicting a unit and system in accordance with a still further embodiment of the invention.

The inlet end connection 236 again includes a pump 240, and again connects through reservoir draw connection 238 with the hot water outlet port 266 of the reservoir. The cold water inlet connection 242 is again connected to the inlet end connection through a throttling valve 246. A bypass pipe 203 communicates with the inlet end connector 236, at a location between the reservoir draw connection point 238 and the juncture of the inlet end connector and the cold water inlet. A check valve 207 is provided in the inlet end connector between the juncture with bypass pipe 203 and the juncture with the cold water inlet 242. The check valve permits flow in the direction indicated, upwardly as seen in FIG. 4, but blocks reverse flow. The bypass pipe communicates with one of the outlet connection pipes 227c at a point downstream from the valve 201c in the outlet connection pipe. A bypass control valve 205 is connected in bypass pipe 205. Bypass control valve 205 has an associated actuator. A recirculation shutoff valve 215 is connected in branch 230 of the outlet end connection structure to the inlet end connection structure. The controller can close valve 215 to block flow from manifold 226 back to the reservoir or open it to allow such flow. The actuators of the aforementioned valves are linked to the controller 205 so that the controller can actuate all of these valves.

In this embodiment, the outlet end connection 224 does not incorporate a check valve. Instead, pump 240 operates continually whenever recirculation shutoff valve 215 is open, and maintains a pressure in the outlet end connection 226 higher than the pressure in the reservoir 262 to prevent flow from the reservoir into the outlet end connection.

The controller 252 is provided with a signal receiver 253 as, for example, a radio receiver or a network-connectable receiver such as an Internet-connectable receiver.

Each of the outlet connection pipes 227 is connected to a different fixture through suitable individual connection lines. In this instance the different fixtures require hot water at different temperatures. For example, outlet connection pipe 227c is connected to a fixture 272c such as a shower head or sink used to deliver for contact with human skin, and requires hot water at a first, lowest use temperature as, for example about 105-110° F. (40-43° C.). Outlet connection pipe 227b is connected to a fixture 272b such as a dishwasher or clothes washer which requires hot water at a second, higher use temperature as, for example about 140-160° F. (60-71° C.). Outlet connection pipe 227c is connected to a fixture such as a coffee brewer 272a which requires hot water at a third, still higher use temperature as, for example 190-200° F. (88-93° C.). Each of the fixtures is equipped with a respective transmitter 211 which is arranged to send a signal in a form which can be received by receiver 253 and which identifies the associated fixture by a preassigned code and which indicates that the particular fixture requires hot water.

In idle mode, controller 252 maintains outlet valves 201a-201c bypass valve 205 closed, and sets recirculation shutoff valve 215 open so as to direct water from manifold 226 to the reservoir 262. In idle mode, the controller maintains the setpoint temperature at the first use temperature corresponding to the lowest water temperature required by any of the connected fixtures. In the same manner as discussed above, the heater operates to bring the water in reservoir 262 to the first use temperature and to maintain it at that temperature. When one of the fixtures requires hot water, it will send a signal through the associated transmitter 211. If the signal indicates that water must be supplied at the second or third use temperature, the controller adjusts the temperature setpoint of heater 218 to the second or third use temperature. When temperature sensor 250 indicates that the water discharged from heater 218 has reached the new setpoint temperature, the controller opens the outlet connection pipe associated with the fixture that sent the signal. For example, if fixture 272a sent a signal, the heater will raise the setpoint temperature to the third use temperature and then open valve 201a. The controller may partially or completely close recirculation valve 215 to keep the temperature of the water in reservoir 262 at the first use temperature. The system remains in this condition until fixture 272a sends another signal indicating that it no longer requires water. If another fixture sends a further signal while the fixture is supplying water to one of the fixtures, the controller will leave the other outlet valves closed. The controller may simply ignore the further signal or may store the request in a queue and act on it later. However, if the first fixture 272 requires water during this time, the controller may leave outlet valve 201c closed but may respond to the request by opening bypass control valve 205, so that water at the first use temperature will be supplied from the reservoir to fixture 272c without passing through the heater.

Once the fixture which originally requested water sends another signal indicating that the request has been fulfilled, controller 252 restores the setpoint temperature to the first use temperature and returns to idle mode operation.

As used in this disclosure, the term "pipe" should be understood as including any element capable of conveying a flowing liquid under pressure, and accordingly includes structures such as flexible hoses and conduits and tubes of non-circular cross-section, as well as common rigid pipes of circular cross-section.

The systems, units and methods according to the present invention can be applied to heat fluids other than water. Also, the terms "cold" and "hot" are not limited to the temperature ranges commonly encountered in application of the invention to plumbing systems. For example, in an industrial system for handling a liquid such as molten metal or a molten salt, the "cold" liquid may be at temperatures of hundreds of degrees Celsius, and the "hot" liquid may be at a still higher temperature.

The following paragraphs set forth certain additional aspects of the invention:

A liquid heating system comprising a reservoir; a cold liquid supply communicating with the reservoir; a heater having an inlet connected to the reservoir through a reservoir draw connection communicating with the reservoir at a level adjacent the top of the reservoir, the heater having an outlet connected to one or more fixtures; a heated liquid return connection connected to the outlet of the heater and communicating with the reservoir so as to return fluid to the reservoir below the level of the reservoir draw connection; and a controller operable to actuate the heater to supply heat to liquid passing from the inlet to the outlet so as to bring the liquid at the outlet to a setpoint temperature, the heater, pump and connections being constructed and arranged so that liquid from the reservoir will only pass through the heater via the reservoir draw connection and will only pass from the heater to the reservoir via the reservoir return connection.

A method of operating a heated liquid supply system comprising the steps of:

(a) in an idle mode, drawing liquid from a reservoir into the inlet through a heater, actuating the heater to heat the liquid, and returning the liquid to the reservoir, and controlling operation of the heater so that the liquid in the reservoir reaches the first setpoint temperature; and (b) in a supply mode, drawing liquid from the reservoir into the heater, while also supplying cold liquid at a temperature below the first setpoint temperature to the reservoir so as to provide a mixture of cold liquid and liquid from the reservoir, while controlling the heater to heat the mixture to a setpoint temperature equal to or above the first setpoint temperature and while controlling the proportion of (i) liquid from the reservoir and (ii) cold liquid in the mixture so that the heater operates at a setpoint heating rate, and while discharging at least some of the heated mixture to a fixture.

A method as described in the immediately preceding paragraph wherein, in both the idle mode and the supply mode, the step of drawing liquid from the reservoir to the heating includes drawing liquid from adjacent the top of the reservoir.

A liquid heating system comprising:

(a) a reservoir;

(b) a cold liquid supply communicating with the reservoir;

(c) a heater having an inlet connected to the reservoir, the heater having an outlet connected to one or more fixtures;

(d) a cold liquid intake connection connected between cold liquid supply and the inlet of the heater, (e) a return connection connected between the outlet of the heater and the reservoir;

(f) a pump connected in series with the heater, so that the pump can draw liquid from the reservoir and impel the liquid in a predetermined downstream direction through the heater and through the return connection to the reservoir; and (g) a controller operable to actuate the heater to supply heat to liquid passing from the inlet to the outlet and to vary the amount of heat supplied to the liquid by the heater within a range of heating rates, the controller being operative to control a ratio of (i) cold liquid from the cold liquid intake connection to (ii) liquid from the reservoir supplied to the inlet of the heater and thereby maintain the heater at a heating rate at or near a setpoint heating rate while maintaining liquid discharged from the outlet of the heater at or near a setpoint temperature.

A system as recited in the immediately preceding paragraph, wherein the heater is connected to the reservoir adjacent the top of the reservoir.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A liquid heating system comprising:

(a) a reservoir;

(b) a cold liquid supply communicating with the reservoir;

(c) a heater having an inlet connected to the reservoir and an outlet connected to one or more fixtures;

(d) a heated liquid return connection connected between the outlet of the heater and the reservoir;

(e) a pump connected in series with the heater, whereby the pump can draw liquid from the reservoir and impel the liquid in a predetermined downstream direction through the heater and through the return connection to the reservoir;

(f) a controller operable to actuate the heater to supply heat to liquid passing from the inlet to the outlet so as to bring the liquid at the outlet to a setpoint temperature, the return connection and pump being constructed and arranged to permit liquid flow from the outlet of the heater to the reservoir but prevent liquid flow from the reservoir to the fixtures through the return connection, and (g) a cold liquid intake connection connected between the source of cold liquid and the inlet of the heater, the cold liquid intake connection being separate from the reservoir such that cold liquid can pass from the cold liquid supply to the inlet of the heater via the cold liquid intake connection without passing through the reservoir, the controller being operative to actuate the cold liquid inlet connection to provide cold liquid flow through the intake connection so that a combination of cold liquid and liquid from the reservoir is supplied to the inlet of the heater.

2. A system as claimed in claim 1 wherein the return connection includes a check valve.

3. A system as claimed in claim 2 wherein the reservoir is closed and the cold liquid supply is arranged to supply the cold liquid under pressure so as to maintain liquid in the reservoir under superatmospheric pressure.

4. A system as claimed in claim 1 wherein the reservoir is open to the atmosphere, so that liquid in the reservoir is under atmospheric pressure.

5. A system as claimed in claim 4, wherein the pump is operable to drive liquid through the heater to the one or more fixtures.

6. A system as claimed in claim 5, further comprising a demand sensor operative to detect operation of one or more of the fixtures to draw liquid from the outlet of the heater, wherein the controller is operative to actuate the circulating pump at a first pumping power to impel liquid through the heater when none of the fixtures is in operation and to a second pumping power higher than the first pumping power when one or more of the fixtures is in operation.

7. A system as claimed in claim 1 wherein the reservoir is unfired.

8. A system as claimed in claim 7 wherein the reservoir is selected from the group consisting of stackable reservoirs, collapsible reservoirs, and reservoirs constructed on site.

9. A system as claimed in claim 1 wherein the controller is operable to vary the amount of heat supplied to the liquid by the heater within a range of non-zero heating rates.

10. A system as claimed in claim 9 wherein the controller is operative to control a ratio of (i) cold liquid from the cold liquid intake connection to (ii) liquid from the reservoir supplied to the inlet of the heater and thereby maintain the heater at a heating rate at or near a setpoint heating rate while maintaining liquid discharged from the heater at or near the setpoint temperature.

11. A system as claimed in claim 10 further comprising a temperature sensor operative to detect the temperature of liquid passing out of the outlet of the heater, wherein the controller is operative to adjust the heating rate applied by the heater so as to maintain the temperature at the setpoint temperature, and to control the ratio responsive to the heating rate applied by the heater.

12. A system as claimed in claim 1 wherein the control system is operative to vary the setpoint temperature responsive to a control input representing a condition prevailing at one or more of the fixtures.

13. A system as claimed in claim 1 wherein the control system is operative to vary the setpoint temperature responsive to a control input representing operation of different ones of the fixtures to draw liquid from the outlet of the heater.

14. A system as claimed in claim 1 further comprising a demand sensor operative to detect operation of one or more of the fixtures to draw liquid from the outlet of the heater, and to raise the setpoint temperature responsive to detection of demand, so that the heater supplies the heated liquid to the fixtures at a temperature higher than a temperature of liquid stored in the tank.

15. A liquid heating system comprising:
(a) a reservoir;
(b) a cold liquid supply communicating with the reservoir;
(c) a heater having an inlet connected to the reservoir and an outlet connected to one or more fixtures;
(d) a heated liquid return connection connected between the outlet of the heater and the reservoir;
(e) a pump connected in series with the heater, whereby the pump can draw liquid from the reservoir and impel the liquid in a predetermined downstream direction through the heater and through the return connection to the reservoir;
(f) a controller operable to actuate the heater to supply heat to liquid passing from the inlet to the outlet so as to bring the liquid at the outlet to a setpoint temperature, the return connection and pump being constructed and arranged to permit liquid flow from the outlet of the heater to the reservoir but prevent liquid flow from the reservoir to the fixtures through the return connection, and
(g) a temperature sensor operative to detect a temperature of liquid passing out of the heater, wherein the controller is operative to adjust the heating rate applied by the heater so as to maintain the temperature detected by the sensor at the setpoint temperature, wherein the controller is operative in an idle condition, while no liquid is being drawn from the system, to deactivate the pump and the heater when the temperature detected by the sensor is at or approximates the setpoint temperature and the heater is not supplying heat, then reactivate the pump after a period of deactivation regardless of the temperature detected by the sensor, and then, responsive to the temperature detected by the sensor, either (i) maintain the pump in operation and activate the heater or (ii) deactivate the pump again.

16. A liquid heating system comprising:
(a) a reservoir;
(b) a cold liquid supply communicating with the reservoir;
(c) a heater having an inlet connected to the reservoir and an outlet connected to one or more fixtures;
(d) a heated liquid return connection connected between the outlet of the heater and the reservoir;
(e) a pump connected in series with the heater, whereby the pump can draw liquid from the reservoir and impel the liquid in a predetermined downstream direction through the heater and through the return connection to the reservoir;
(f) a controller operable to actuate the heater to supply heat to liquid passing from the inlet to the outlet so as to bring the liquid at the outlet to a setpoint temperature, the return connection and pump being constructed and arranged to permit liquid flow from the outlet of the heater to the reservoir but prevent liquid flow from the reservoir to the fixtures through the return connection, and
(g) a temperature sensor operative to detect the temperature of liquid passing from the reservoir to the heater, wherein the controller is operative to adjust the heating rate applied by the heater responsive to the temperature detected by the sensor so as to maintain a temperature of liquid passing out of the heater at the setpoint temperature, and wherein, operative in an idle condition, while no liquid is being drawn from the system, the controller is operative to deactivate the pump and the heater when the temperature detected by the sensor is at or approximates the setpoint temperature, then reactivate the pump after a period of deactivation regardless of the temperature detected by the sensor, and then, responsive to the temperature detected by the sensor, either (i) maintain the pump in operation and activate the heater or (ii) deactivate the pump again.

* * * * *